US012778724B2

(12) United States Patent
Crovato et al.

(10) Patent No.: US 12,778,724 B2
(45) Date of Patent: Nov. 3, 2026

(54) APPARATUS AND METHOD FOR ACQUIRING A DENTAL IMPRESSION BY MEANS OF INTRAORAL DIGITAL SCANNING

(71) Applicants: Diego Crovato, Saonara (IT); Gabriele Abrami, Flero (IT); Sergio Guirao Cano, Lalsosa la Massana (AD)

(72) Inventors: Diego Crovato, Saonara (IT); Gabriele Abrami, Flero (IT); Sergio Guirao Cano, Lalsosa la Massana (AD)

(73) Assignee: IOSFIX.DENTAL S.R.L., San Paolo (IT)

( * ) Notice: Subject to any disclaimer, the term of this patent is extended or adjusted under 35 U.S.C. 154(b) by 237 days.

(21) Appl. No.: 18/707,038

(22) PCT Filed: Mar. 10, 2022

(86) PCT No.: PCT/IB2022/052164
§ 371 (c)(1),
(2) Date: May 2, 2024

(87) PCT Pub. No.: WO2023/079373
PCT Pub. Date: May 11, 2023

(65) Prior Publication Data

US 2025/0009482 A1 Jan. 9, 2025

(30) Foreign Application Priority Data

Nov. 3, 2021 (IT) ........................ 102021000027989

(51) Int. Cl.
*A61C 9/00* (2006.01)

(52) U.S. Cl.
CPC .................................. *A61C 9/0053* (2013.01)

(58) Field of Classification Search
CPC .............................. A61C 9/0053; A61C 9/004
See application file for complete search history.

(56) References Cited

U.S. PATENT DOCUMENTS 6,558,162 B1 * 5/2003 Porter .................. A61C 8/0001 433/213
10,098,714 B2 * 10/2018 Kuo ..................... A61C 9/0093
(Continued)

FOREIGN PATENT DOCUMENTS

WO 0134057 A1 5/2001
WO 2006111964 A2 10/2006
(Continued)

OTHER PUBLICATIONS

International Search Report for PCT/IB2022/052164 dated Jul. 12, 2022, 5 pages.
(Continued)

*Primary Examiner* — Tom Y Lu

(74) *Attorney, Agent, or Firm* — NIXON & VANDERHYE

(57) ABSTRACT

The present invention relates to an apparatus and a method for acquiring a dental impression by means of intraoral digital scanning. The apparatus comprises a control unit, an intraoral scanner connected to the control unit and a reference device (1) to be fixed to the dental arch, wherein said control unit is configured to receive the set of data acquired by the scanner representing a three-dimensional image of at least one portion of the dental arch and of the reference device applied thereto, and to process the acquired data set as a function of a set of predetermined geometric reference data for the reference device (1) provided as input data for the control unit.

11 Claims, 11 Drawing Sheets

(56) References Cited

U.S. PATENT DOCUMENTS

| | | | | |
|---|---|---|---|---|
| 11,759,295 | B2 * | 9/2023 | Sabina | A61B 1/00172 348/66 |
| 12,268,567 | B2 * | 4/2025 | Schmid | A61C 13/0004 |
| 12,402,988 | B2 * | 9/2025 | Atiya | A61C 9/0053 |
| 12,459,204 | B2 * | 11/2025 | Gerth | A61C 13/0019 |
| 12,521,218 | B2 * | 1/2026 | Sun | A61C 19/003 |
| 2015/0209118 | A1 | 7/2015 | Kopelman et al. | |
| 2020/0146790 | A1 | 5/2020 | Marshall et al. | |

FOREIGN PATENT DOCUMENTS

| | | | |
|---|---|---|---|
| WO | 2014020247 | A1 | 2/2014 |
| WO | 2015154125 | A1 | 10/2015 |
| WO | 2018019274 | A1 | 2/2018 |
| WO | 2020182701 | A1 | 9/2020 |
| WO | 2021013630 | A1 | 1/2021 |

OTHER PUBLICATIONS

Written Opinion of the ISA for PCT/IB2022/052164 dated Jul. 12, 2022, 5 pages.

* cited by examiner

APPARATUS AND METHOD FOR ACQUIRING A DENTAL IMPRESSION BY MEANS OF INTRAORAL DIGITAL SCANNING

CROSS-REFERENCE TO RELATED APPLICATIONS

This application is the U.S. national phase of International Application No. PCT/IB2022/052164 filed Mar. 10, 2022 which designated the U.S. and claims priority to IT patent application No. 102021000027989 filed Nov. 3, 2021, the entire contents of each of which are hereby incorporated by reference.

The present invention relates to an apparatus and the relative method for acquiring a dental impression of a subject (generally a patient) by means of intraoral digital scanning. More in detail, the invention relates to an apparatus which includes a reference model, with a known and predetermined geometry, to be used during the scan and a computer system, programmed to process the data acquired during the scan on the basis of the geometric data of the reference model.

Restorations in the form of dental prostheses may be needed to address partially or fully edentulous conditions. Traditionally, such restorations are performed by obtaining an impression of the affected areas of the patient's mouth, developing a plaster model from the impression and manufacturing a customized prosthetic device on the plaster model.

The impression is used to detect the three-dimensional positions, in space, i.e. in the patient's oral cavity, of the arches, teeth and implants.

Taking the impression is the most important and critical step to create a "master" model, usually in dental plaster, i.e. the precise replica of the patient's dental arch, including the dental surfaces and the residual ridges.

This model is then used for the construction of the prosthesis.

Since the osseointegrated type implant has a high rigidity, its construction must be extremely precise since any inaccuracies, in the jargon "misfits", may cause biomechanical complications with consequent biological effects, that is, in some cases, the reduction of the duration of the implant-prosthesis system, i.e. An early osseointegration thereof. In addition to this, such geometric and dimensional inaccuracies often generate painful conditions for the patient.

The traditional technique of taking impressions involves the use of elastic materials, such as salts of alginic acid or silicone materials.

While allowing the creation of accurate models, this procedure, in addition to being quite invasive and annoying, creates discomfort for the patient and is laborious and time-consuming.

To overcome these drawbacks, intraoral scanning (IOS) has recently emerged as a preferred dental impression technique for conventional and implant dentistry. The intraoral scanning technique typically involves using a handheld scanner provided with optical sensors to acquire a three-dimensional set of data of the area of interest. The resulting set of data may be used to build a model for preparing patient-specific prostheses. An example of using such sets of data to build a model is described in U.S. 2011/183289 A1.

The use of these digital technologies has allowed a reduction in the measurement times, waiting for the patient and the creation of the final prosthesis, as well as eliminating the cost of the material for the impression. The expected final goal is to be able to work exclusively on digital (virtual) models, for the final realization of prosthetic crowns or prosthetic implants for the patient, and to be able to manufacture such prostheses with such accuracy as not to require further modification of the prosthesis on the patient, thus limiting the variability introduced by the operator and the consequent human errors.

The manufacturing steps include the digitization of both the implant position and the opposite "antagonist" arch, the CAD drawing of the prosthesis and its manufacture.

Today, however, these systems still have limits of precision and accuracy to obtain a sufficiently precise digital impression and model.

Some known apparatuses also include methods for optimizing the data obtained by the intraoral scanner, such as those described in U.S. Pat. No. 9,198,627 B2 and WO 2020197116 A1.

Even with such apparatuses, although the accuracy has proved sufficiently precise and efficient for the restorations of single teeth or short edentulous segments of teeth, it is instead often contraindicated for the scanning of larger edentulous segments or even in the presence of total edentulism.

The intraoral scanner, in fact, is provided with an optical window of limited size; therefore, in order to scan the entire arch it is therefore necessary to process several images acquired in sequence with a software programmed to "join" said images acquired not simultaneously.

However, the three-dimensional images provided by the intraoral scanner show some geometric distortions between what was reconstructed and the real positions and shapes of the dental arches. Furthermore, these errors are not uniform, but vary according to the dental section processed.

This therefore often involves discrepancies in the digital impression obtained with respect to the real shape, due to which adaptations, sometimes complex, of the prosthesis obtained from the digital impression or in any case of the implant on the patient are required.

In this context, it is an object of the present invention to propose an apparatus and a method for acquiring a digital impression by means of intraoral scanning which overcomes the drawbacks of the prior art.

In particular, it is an object of the present invention to provide an apparatus and a method which allow the accuracy and precision of the known intraoral scanning to be improved to allow a reliable scan of the entire dental arch.

In particular, it is an object of the invention to develop an apparatus and a method which allow the deformation errors during the processing (overlapping) step of the various images acquired by the intraoral scanner to be significantly reduced.

Another object of the present invention is to provide an apparatus which may be used for extraoral scanning with a quality comparable to that provided by a laboratory scanner.

These and other objects are achieved by an apparatus according to claim 1. The aforementioned objects are also achieved with a method according to claim 10.

In detail, the invention relates to an apparatus for acquiring a dental impression by means of intraoral digital scanning, where the apparatus is configured to produce a set of data representative of the scanning of the dental arch. According to the invention, said apparatus comprises:

a control unit;

an intraoral scanner connected to the control unit; and a reference device to be fixed to the patient's dental arch.

According to a first aspect of the invention, said reference device comprises a support element which includes at least one curved portion adapted to be placed inside or outside the patient's dental arch or on the latter, i.e. at least in the vestibular area or in the buccal cavity when the device is placed in the patient's mouth.

Said curved portion, preferably, has an arch shape with a profile similar to that of the dental arch and has a size such that it may be positioned in the vestibular area or in the buccal cavity close to the patient's dental arch.

According to a preferred variant, said support element comprises a first arched portion, also called outer portion, to be positioned in the vestibular area, and a second arched portion, also called inner portion, to be placed in the buccal cavity. The two first and second portions are preferably joined to form a single element with a closed (ring) profile which surrounds the entire dental arch.

The support element is made of a rigid material, typically of metal, preferably of medical titanium or medical steel, or, possibly, of resin or other non-metallic materials of adequate mechanical strength.

According to a preferred variant, the inner and outer portions of the support element comprise a curved bar with a section having a substantially rectangular or square shape, possibly with chamfered or rounded edges, or circular or semicircular.

The base, the height or the maximum diameter of the section have a dimension preferably between 2 mm and 10 mm, more preferably between 3 mm and 8 mm. More generally, the bar section has a surface between 5 $mm^2$ and 40 $mm^2$.

These dimensions allow the support element to have a mechanical strength, therefore a rigidity, sufficient to prevent it from deforming when it is fixed to the patient's dental arch, and at the same time that it may be positioned in the vestibular area and/or in the lingual area without causing excessive discomfort to the patient.

According to the invention, the reference device further comprises three-dimensional reference elements fixed to the support element.

Said reference elements preferably project, in the same direction, from a surface of the support element.

According to the invention, said reference elements preferably have an axial symmetrical shape with a reference axis, such as for example cylinders, cones, truncated cones, spheres or spherical caps.

Said reference elements may all have the same height or, preferably, different heights. This feature allows better compensating for dimensional errors in the vertical direction.

According to an aspect of the invention, said reference elements are preferably fixed to the support element so that the respective reference axes are all parallel to each other.

According to another aspect of the invention, the reference elements may be provided with graphic signs which allow a better identification of their geometric parameters, as will be better described hereinafter. Said graphic signs may comprise for example coloured drawings (white, black, red) such as targets or concentric circles, placed on the lateral surface or, preferably, on the top of the elements.

Optionally, also the support element may be provided with said graphic signs or the like.

According to another aspect of the invention, the reference device may have an axis of symmetry as a whole.

According to another aspect of the invention, the reference device comprises a fixing element which allows the reference device to be fixed to the dental arch.

According to a variant, said fixing element may comprise a plate, which may be movably coupled to the support element. In the aforesaid plate, openings may be obtained which allow the fixing elements of the dental implant, so-called scanabutments, to be accommodated therein when the reference device is placed in the patient's mouth.

The plate is preferably fixed to said scanabutments by means of a suitable dental adhesive product.

The plate is preferably made of a rigid polymeric material, which may be easily pierced or fractured to create the aforementioned openings.

According to another variant, the reference device is provided with fixing means which comprise at least one articulated arm, one end of which is connected to the support element and whose second end, distal, may be fixed to a scanabutment of the dental implant.

In the variant in which the support element is fixed to the dental arch, it is generally made to measure for a specific patient. This variant is more practical when the arch has a large number of scanabutments.

The support element according to this variant is preferably made by processing a resin or metal support, the shape whereof is obtained starting from the data of a three-dimensional scanning.

Typically, the support element is shaped to have seats or holes at the teeth and scanabutments present on the arch.

According to a possible embodiment, the customized support element is made starting from a digital technical drawing.

According to another variant, said customized support element may comprise a plurality of annular elements which may be hooked together which may be applied to the scanabutments. Said rings are preferably connected in an articulated manner so as to be able to be oriented to follow the exact inclination of the scanabutments.

According to the method of the present invention, each reference device is associated with a set of geometric reference data representative of its shape, i.e. of its three-dimensional image, which are used as calibration data. Said geometric reference data generally correspond to a three-dimensional scan of the reference device.

Typically, the geometric reference data are calculated by software in which the algorithm object of the present invention is implemented, processing the digital scanning obtained by means of a laboratory scanner or other devices of equivalent precision. Said geometric reference data are used by the control unit of the apparatus.

The geometric reference data are provided as input to the control unit of the apparatus.

According to the invention, said control unit is configured to receive the data acquired by the intraoral scanning, by means of an intraoral scanner, representative of a three-dimensional image of the dental arch and of the reference device applied to it and to process (or correct) the aforementioned data acquired on the basis of geometric reference data.

In practice, during the scanning step, the intraoral scanner simultaneously acquires data relating to both the shape of the reference device and the shape of the patient's dental arch (or of the model, in the case of extraoral scanning).

The method according to the present invention therefore provides for determining the distortion factors between the expected image of the reference device and that actually acquired with the intraoral scanner.

These factors are used in the correction and optimization process to define correction factors to be applied to subsequent acquisitions of the dental arches to obtain a real and correct representation.

More in detail, the method of the present invention provides for associating each point P of the acquired data set to a coordinate (r, θ, z) with respect to the origin of a reference system (X, Y, Z) integral with the reference device.

According to the invention, the method provides for correcting the position of each point P of the acquired set of data as a function of one or more parameters calculated on the basis of the difference between the position of at least one identification point of each reference element in the set of geometric reference data and the position of said identification point in the set of acquired data.

Said at least one identification point of each reference element may be, for example, the point of intersection of the reference axis with the upper surface.

According to a preferred embodiment, the point of origin of the reference system (X, Y, Z) is positioned at an intermediate point between two reference elements located in the rear area of the support element and arranged symmetrically with respect to the symmetry axis of the device. In detail, the axis X is oriented along the direction joining the rotation axes of said rear reference elements, the axis Y, coincident with the symmetry axis, extends between the point of origin and a central reference element in the front part of the reference device and the axis Z (obtained by definition of a right-handed reference system) is parallel to the rotation axes of the reference elements.

Further features and advantages of the present invention will become more apparent from the description of a preferred but non-exclusive exemplary embodiment, as shown in the accompanying figures, in which.

Figure 9:
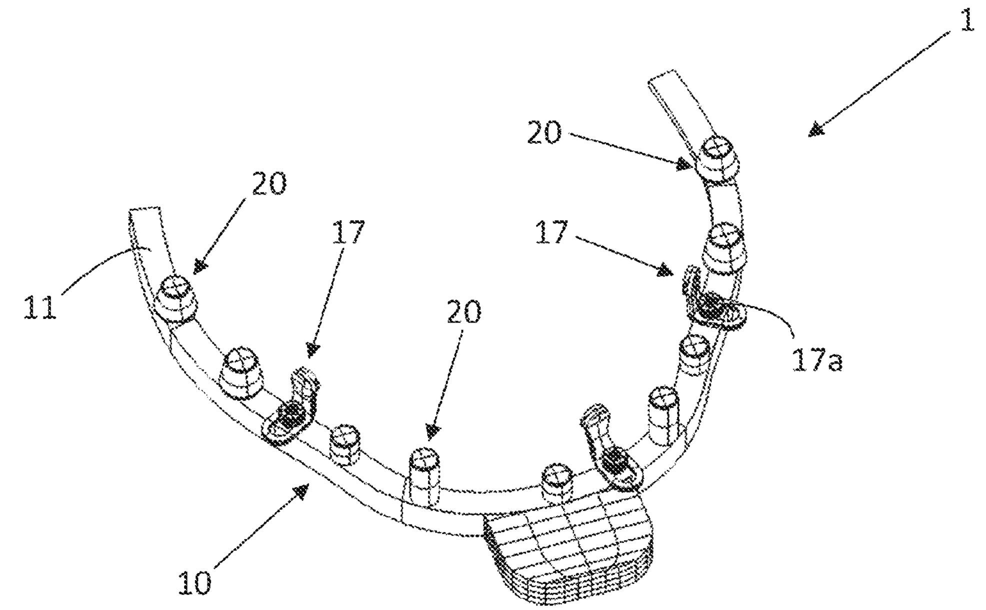
Figure 10:
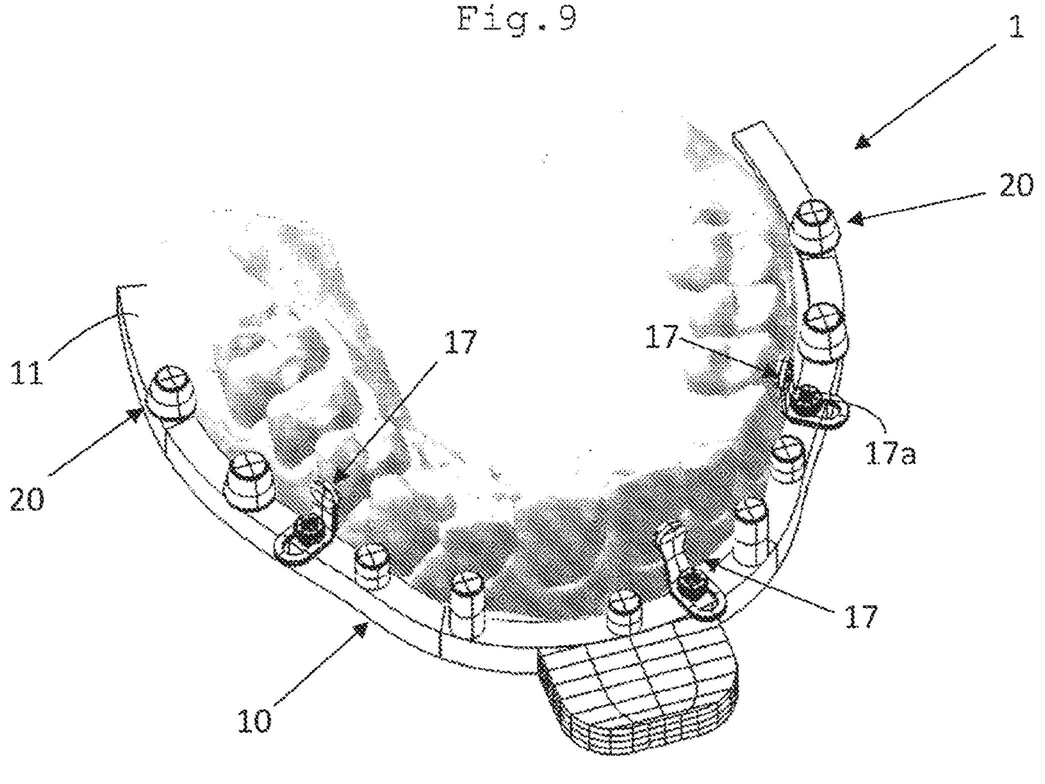
Figure 11:
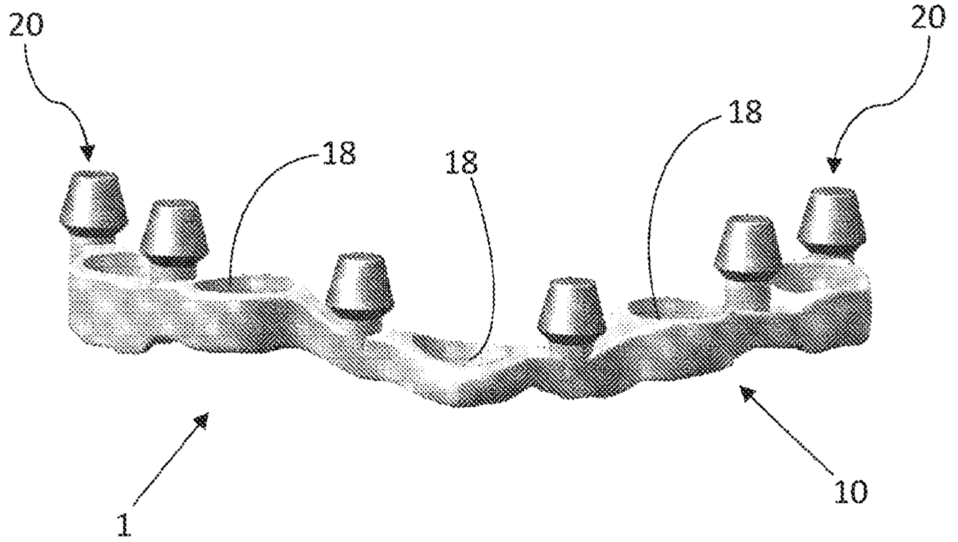
Figure 12:
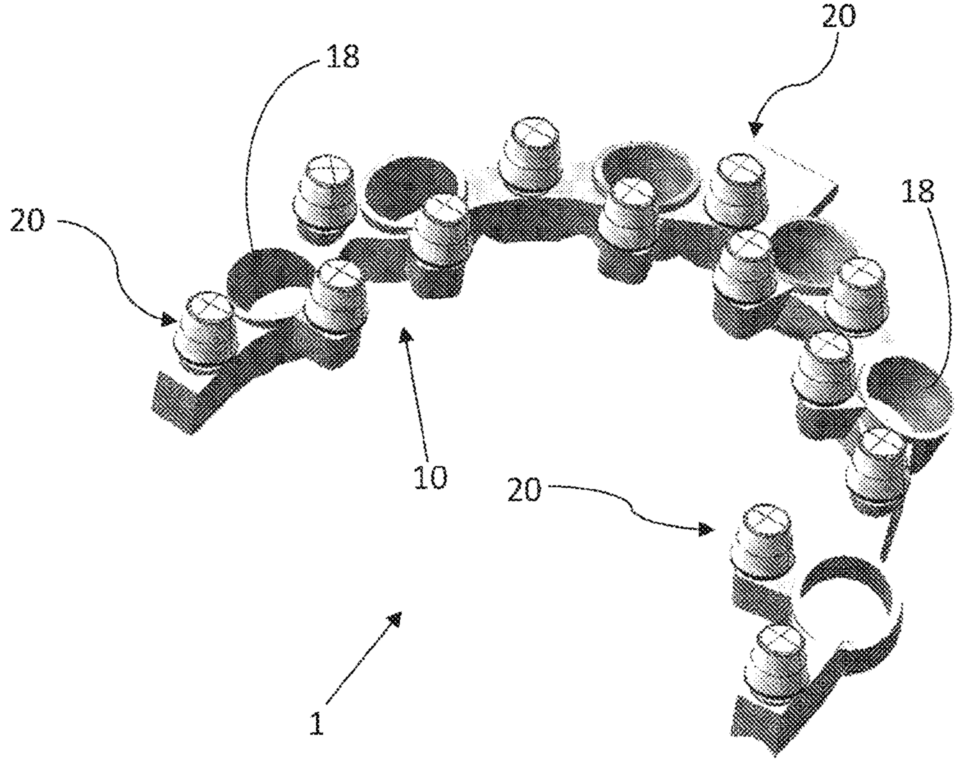
Figure 13:
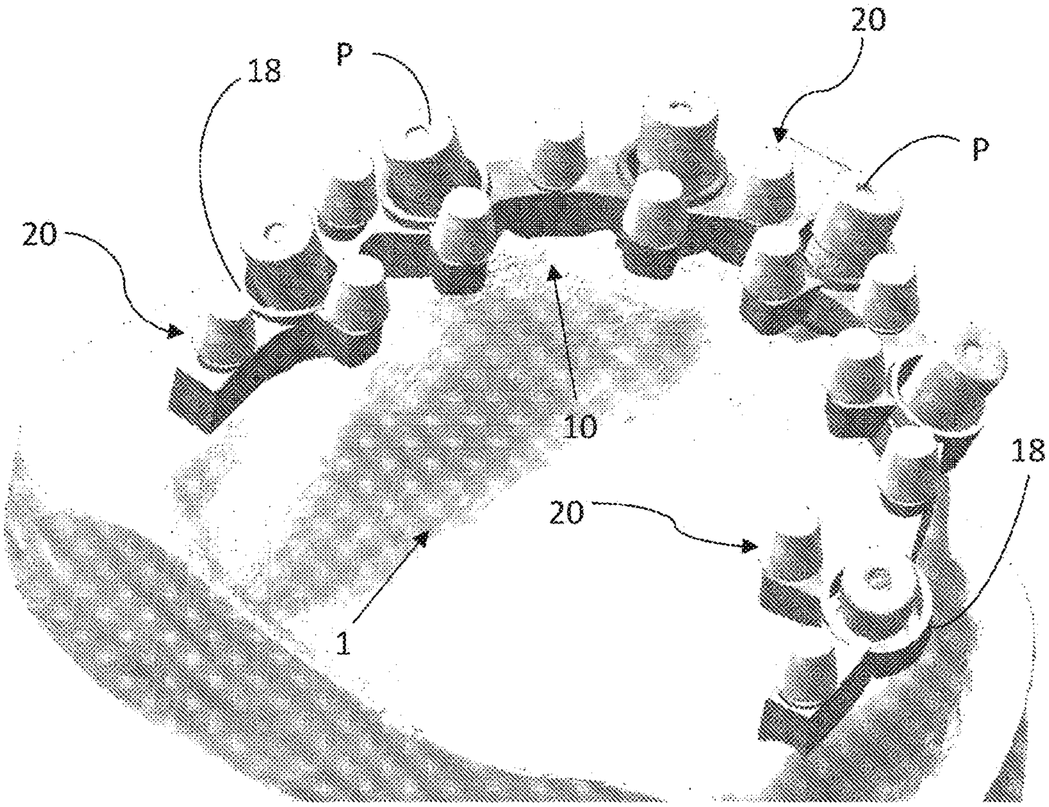
Figure 19:
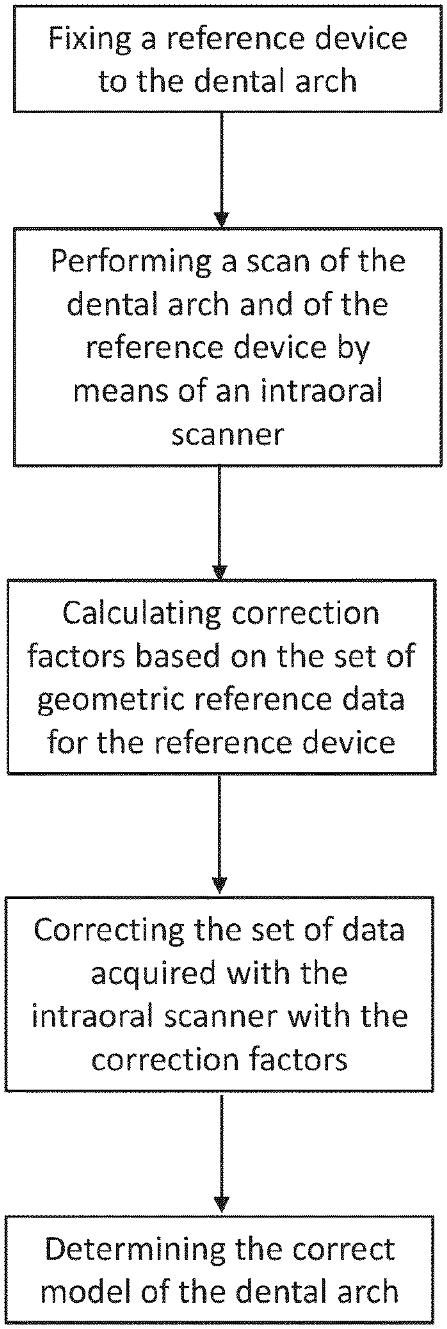

FIG. *8a* is a perspective view of the reference device according to another embodiment of the invention;

FIGS. *8b* and *8c* are detailed views of the reference device of FIG. *8a*;

FIG. 9 is a perspective view of the reference device according to a further embodiment of the present invention;

FIG. 10 is a perspective view of the reference device of FIG. 9 applied to a dental arch;

FIGS. 11 and 12 are perspective views of the reference device according to a further embodiment of the present invention;

FIG. 13 is a perspective view of the reference device of FIG. 12 applied to a dental arch;

FIGS. 14 to 18 are schematic representations of some process steps of the intraoral scanning data according to the method of the present invention;

FIG. 19 is the representation of a flow chart representative of the steps of acquiring the dental impression with the apparatus and method of the present invention.

With reference to the accompanying figures, the reference numeral 1 generally indicates a reference device to be applied to the dental arch of a patient to perform an intraoral scanning with a known intraoral scanner.

According to the embodiment of FIGS. 1 to 8, the reference device 1 comprises a support element 10 to which a plurality of reference elements 20 are fixed.

The support element 10 comprises at least two curved portions and two pairs of parallel portions, of which, in each pair, a first outer portion 11 and a second inner portion 12. Said outer 11 and inner 12 portions both have a substantially arched shape and are arranged with their respective convexities facing in the same direction.

As mentioned above, the outer portion 11 is adapted to be placed in the vestibular area, while the inner portion 12 is adapted to be placed in the buccal cavity, substantially above the tongue.

Each of said curved portion is at a first end of each pair formed by the outer and inner portions and forms a curved extension 13 which acts as a connecting element which makes said portions 11 and 12 integral.

The support element 10 thus generally assumes a closed form of a closed curved profile. The space 14 between the two outer 11 and inner 12 portions allows the reference device 1 to surround the dental arch when in use, i.e. when placed in the patient's mouth to perform the intraoral scanning or when it is fixed to a model, to perform an extraoral scan, as better illustrated below.

According to a preferred variant, the support element 10 is made in a single piece.

More in detail, the support element 10 is a body which has the shape of a curved bar which comprises the first outer portion 11, the second inner portion 12. Said bar has a polygonal shaped section with a rectilinear main side which forms a support surface 16 for all the reference elements 20.

The support element 10 is provided with a gripping tab 15 which allows easier manipulation of the reference device during the fixing operations to the dental arch. Said tab 15 is positioned halfway along the length of the curved bar, so as to project from the outer portion 11, on the same plane thereof.

Said tab 15 is preferably made in one piece with the outer portion 11.

According to the invention, the reference elements 20 of the reference device 1 project from the support surface 16 of the support element 10.

In the variant illustrated in the figures, said reference elements 20 comprise cylinders and truncated cones with different heights, i.e. the upper surfaces 21 of which are placed at different distances from the support surface 16.

Said reference elements 20 may be integral (monolithic) with the support element 10 or, preferably, fixed to the latter by means of joints, screw means or equivalent means.

Said reference elements 20 are preferably arranged with their respective axes all parallel to each other and perpendicular to the support surface 16 of the support element 10.

As mentioned above, some of said reference elements 20 may be used to determine the position of the axes (X, Y, Z) of the reference system of the device.

Figure 1:
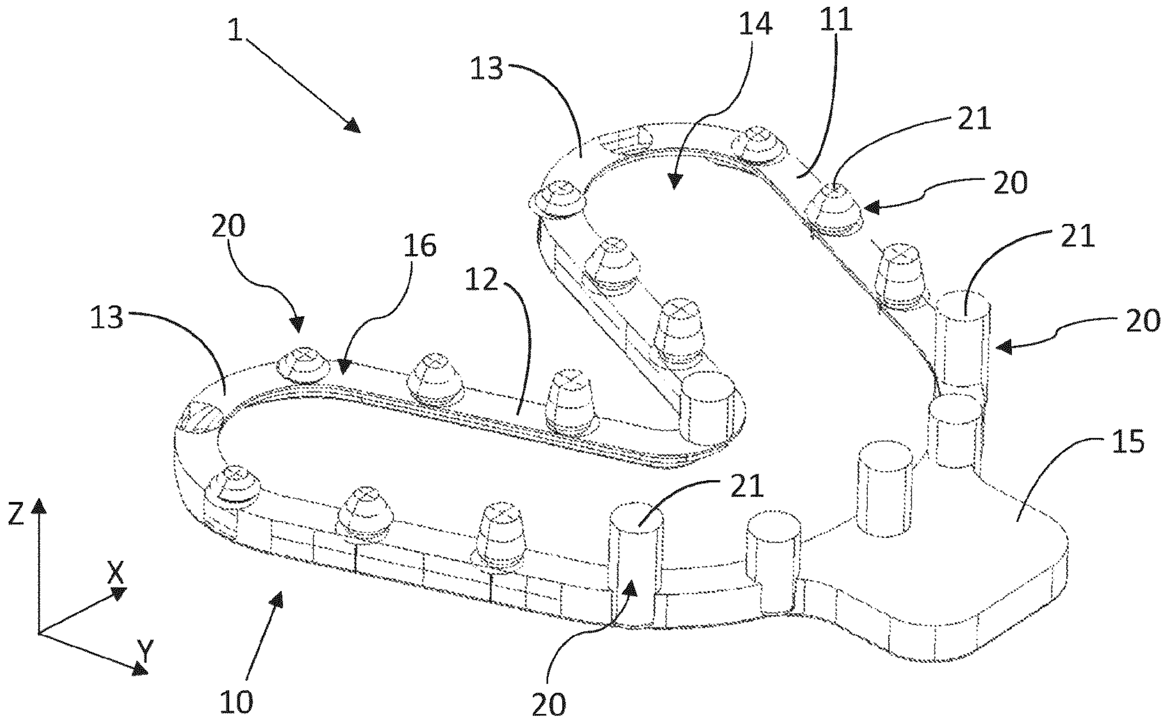
FIG. 1 is a top perspective view of a reference device according to an embodiment of the present invention.
Figure 2:
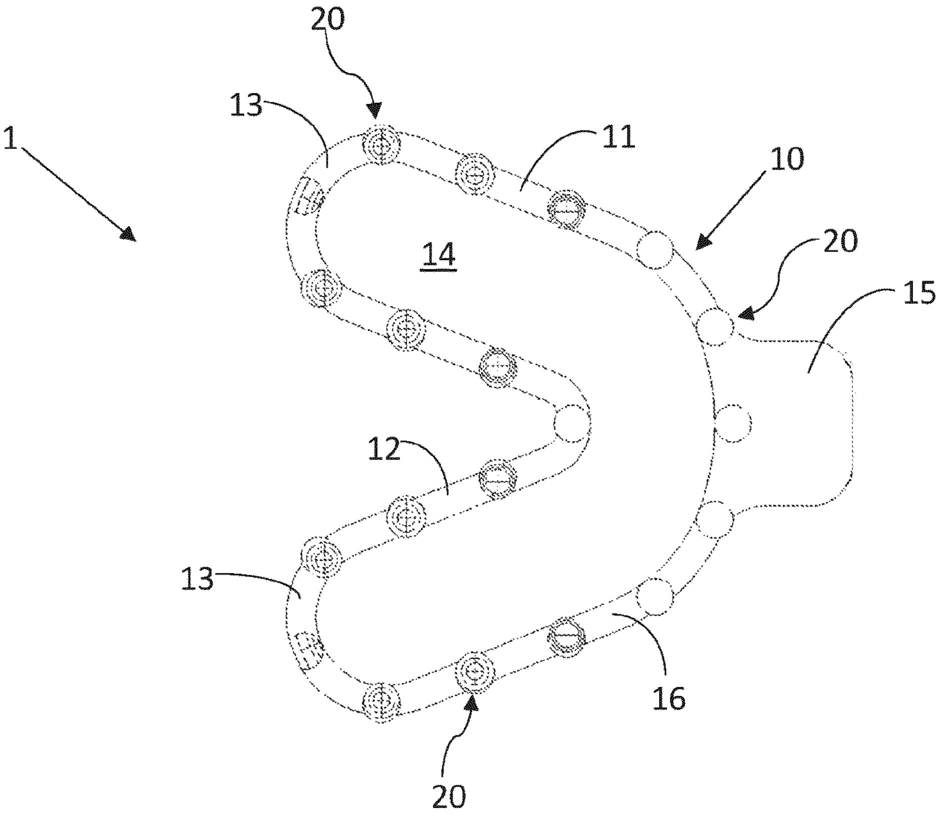
FIG. 2 is an upper side plan view of the reference device of FIG. 1.
Figure 3:
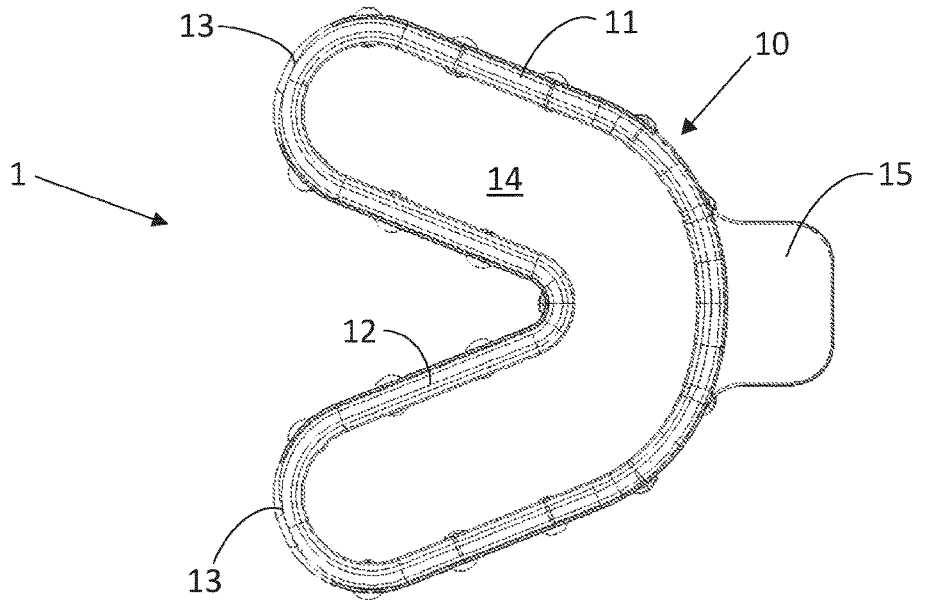
FIG. 3 is a lower side plan view of the reference device of FIG. 1.
Figure 4:
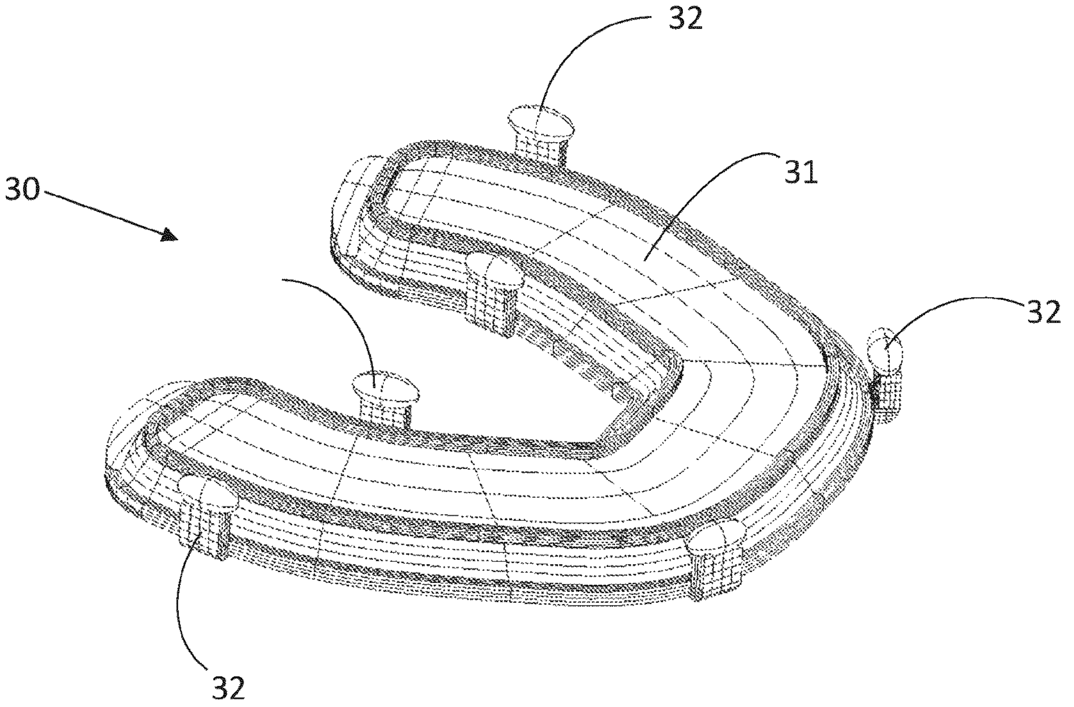
FIG. 4 is a perspective view of a fixing element of the reference device of FIG. 1.

FIG. 4 illustrates a fixing element 30 used to allow fixing of the reference device 1 to the dental arch.

Said fixing element 30 comprises a plate 31 having a shape with a perimeter substantially equal to that of the reference device 1, in particular to the shape of the curved bar which comprises said outer 11 and inner 12 portions, and the connecting elements 13.

Figure 5:
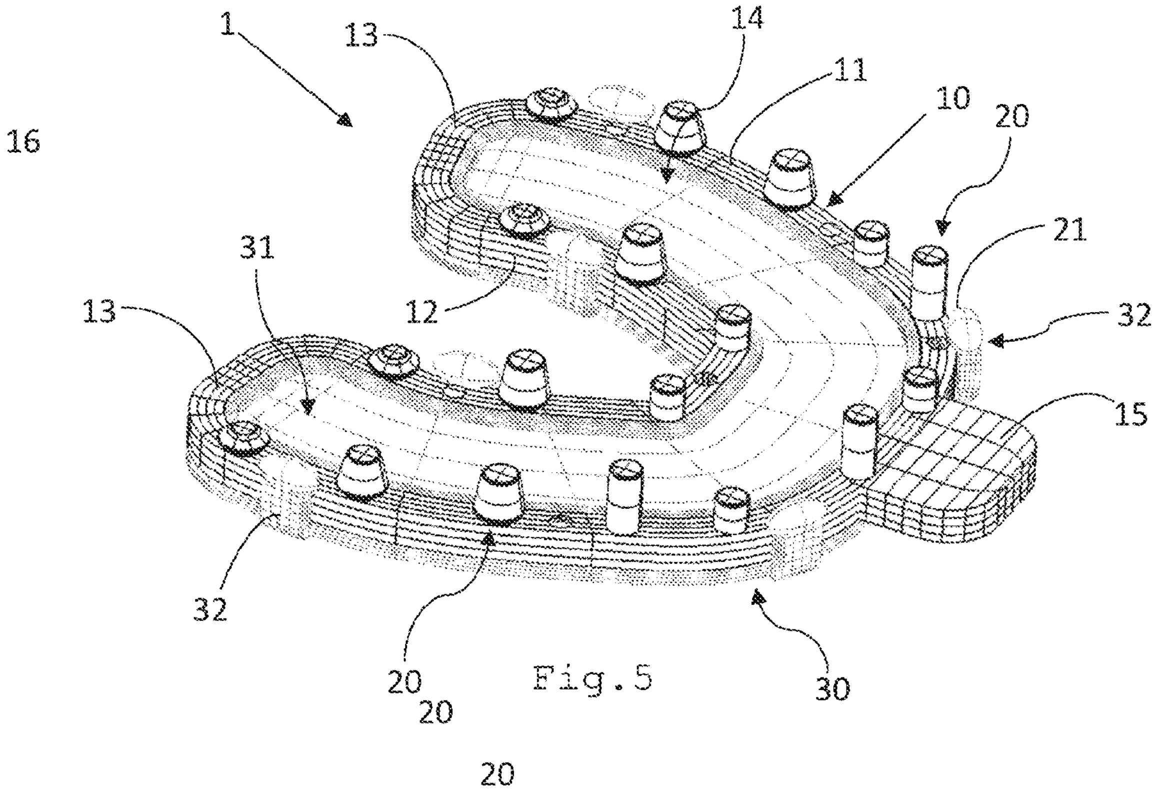
FIG. 5 is a perspective view of the reference device of FIG. 1 coupled to the fixing element of FIG. 2.
Figure 6:
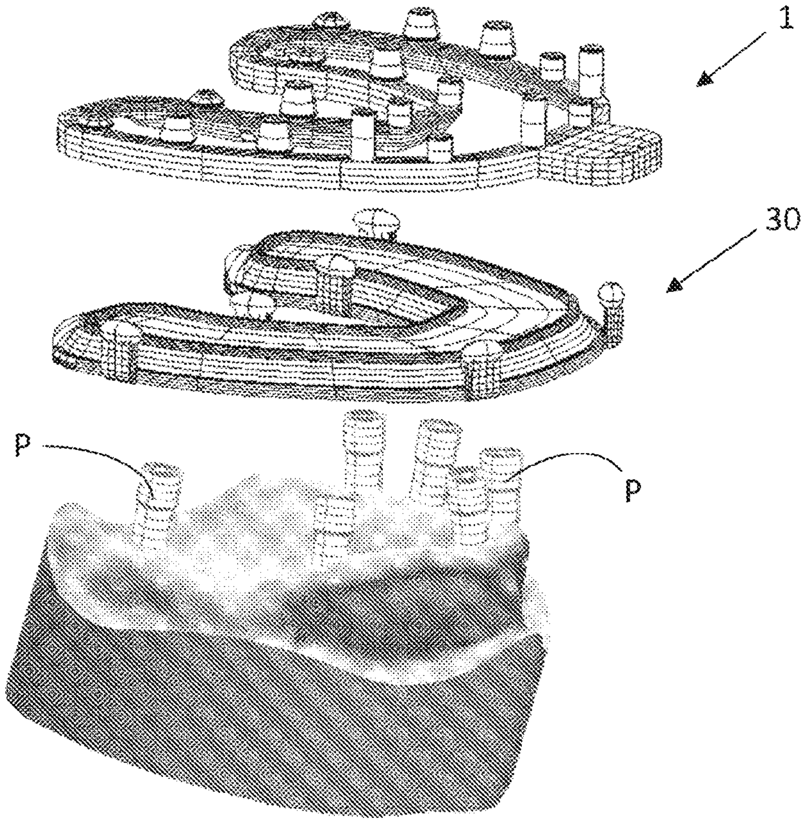
FIG. 6 is an exploded perspective view of the reference device of FIG. 1 during the fixing to a dental arch.

Said fixing element 30 further comprises elastic tabs 32 adapted to snap together with the profile of the support element 10. In this way, the fixing element 30 may be fixed to the underside of the support element 10 as shown in FIG. 5.

The plate 31 is made of a polymeric material preferably selected from polypropylene (PP) and biocompatible resins suitable for directly printing surgical prostheses with 3D printers, such as Dental SG resin.

The plate 31 has a thickness preferably comprised between 1 mm and 3 mm.

In this way, said fixing element 30 has sufficient rigidity to keep the reference device 1 stable with respect to the dental arch, but, at the same time, it has a limited mechanical resistance which allows it to be fractured or punctured by applying a modest pressure with a pointed tool or the like.

Figure 7:
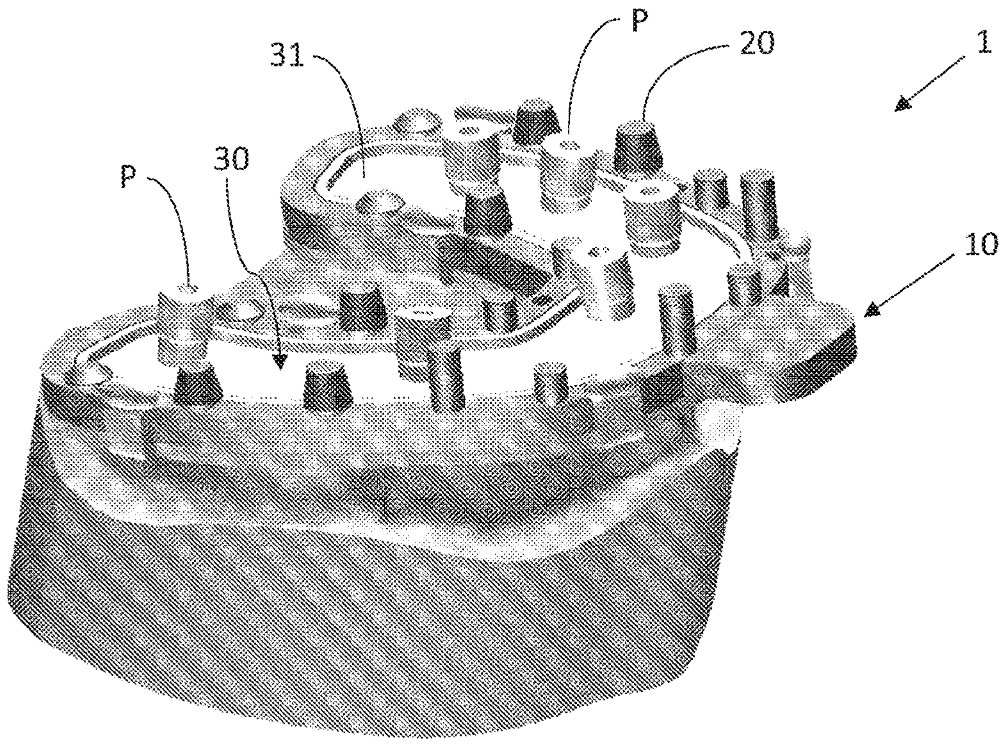
FIG. 7 is a perspective view of the reference device of FIG. 1 fixed to a dental arch.

In fact, according to the method of the present invention, to arrange the fixing element 30 on the dental arch, openings are made in the plate 31, by breaking the material of the plate 31, at the scanabutments P of the dental implant, which openings allow the scanabutments P to project from the surface of said plate 31 so that they may be detected by the intraoral scan together with the reference elements 20 of the reference device 1, as shown in FIG. 7.

To fix the fixing element, and therefore the reference device 1, to the dental arch, suitable adhesive materials are used, such as dual composite resins, applied at the openings in the plate 31 and the scanabutments P of the dental implant.

Figure 8A:
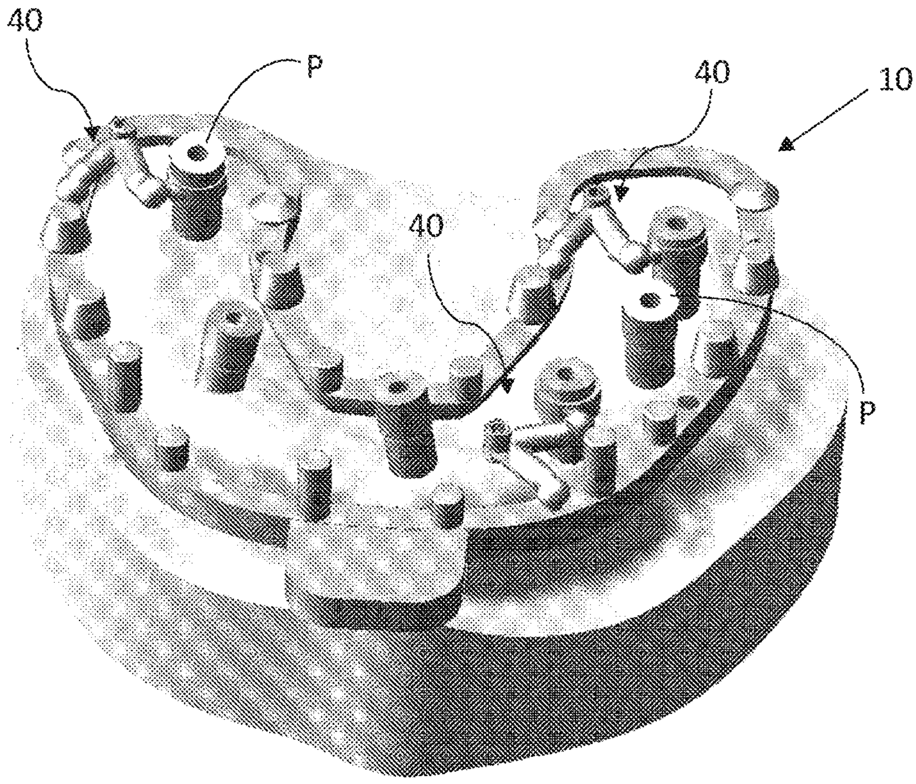
Figure 8B:
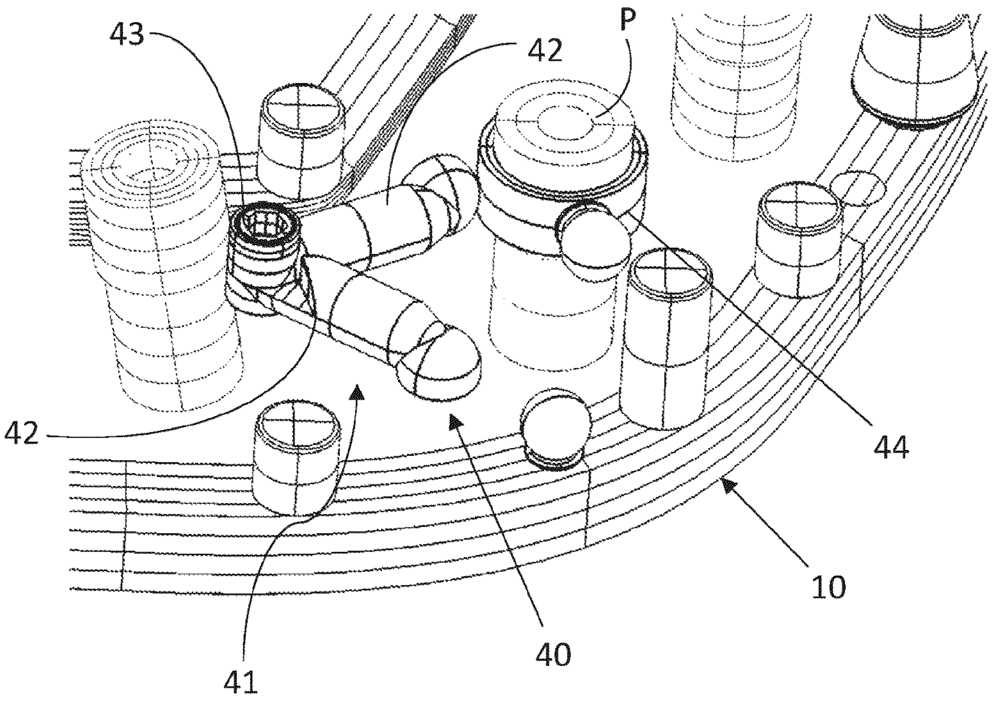
Figure 8C:
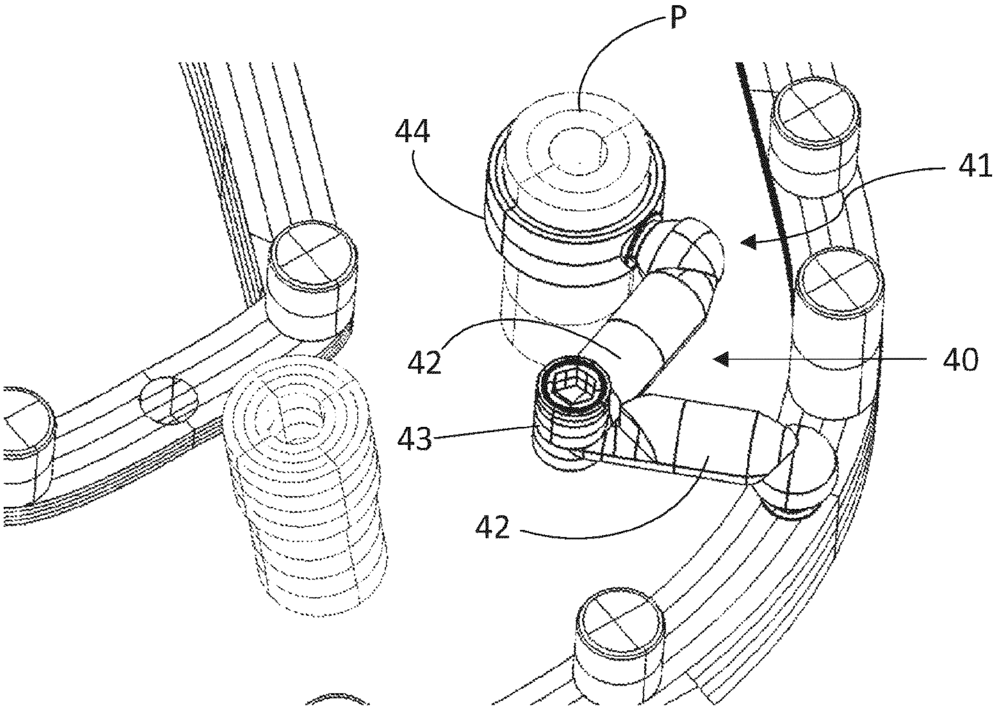

FIGS. 8*a* to 8*c* illustrate the reference device 1 according to another embodiment of the invention. According to this variant, the device 1 is provided with fixing means 40 comprising articulated arms 41, a first end of which is connected to the support element 10 and the second distal end of which may be fixed to the scanabutments P of the dental implant, for example by means of a collar 44 or the like. Said arms 41 preferably comprise two or more portions 42 joined by hinge means 43, preferably of the lockable type, which allow the fixing device 1 to be arranged in the most correct and comfortable position for the patient irrespective of the position of the scanabutments P.

Once the position has been adjusted, the hinge means 43 may be locked so as to maintain the position of the reference device 1 stable with respect to the dental arch during intraoral scanning.

FIGS. 9 and 10 show the reference device 1 according to another embodiment of the invention. According to such variant, the support element 10 comprises only an arch-curved portion 11 adapted to be positioned in the vestibular area of the mouth, or in any case externally to the dental arch. Also in this variant, on the support element 10 there are fixed cylindrical and frusto-conical reference elements 20 which project from the support surface 16.

This variant is particularly advantageous for obtaining dental impressions, by means of intraoral scanning, of patients who require orthodontic rehabilitation. In this case, the presence of an arch without dental caps limits the space available for positioning the support element. Furthermore, in the advanced stages of the rehabilitation process, this variant may be used for wearers of a fixed dental (orthodontic) appliance, which could interfere with the inner portion of the device described in the variants of FIGS. 1 to 8 or in any case make it difficult to fix it on the inner part of the dental arch.

According to this variant, the reference device 1 is preferably fixed to the dental arch by means of the aforementioned adhesive products.

More specifically, to facilitate fixing, the support element 10 is preferably provided with brackets 17 which may be glued to the patient's teeth. Said brackets 17 are preferably connected to the support element 10 by means of a screw 17*a* and have a slot-shaped seat for said screw 17*a* which allows the position thereof to be adjusted.

FIGS. 11 to 13 show the reference device 1 according to another embodiment of the invention. According to such variant, the support element 10 is completely customized, i.e. it is made according to the geometry of the patient's dental arch and the scanabutments P present.

In detail, the support element 10 comprises an arched body in which a plurality of cylindrical seats 18 are obtained, adapted to accommodate the scanabutments P by means of which the support element 10 is then fixed by means of the aforementioned adhesive products, as shown in FIG. 13.

The reference elements 20 are fixed to the support element 10 and project from the support surface 16, as in the variants described above.

According to the method of the present invention, each point of the scan is preferably associated with a set of polar coordinates (r, θ, z) with respect to the origin of the reference system (X, Y, Z).

As mentioned above, in order to better compensate the variations in the vertical dimension, the reference elements preferably have at least two different heights, with a predetermined difference $Z_{TB}$, and the elements of different height are arranged in alternate positions on the support element.

Therefore, two points at different heights are identified at each reference element.

Figure 18:
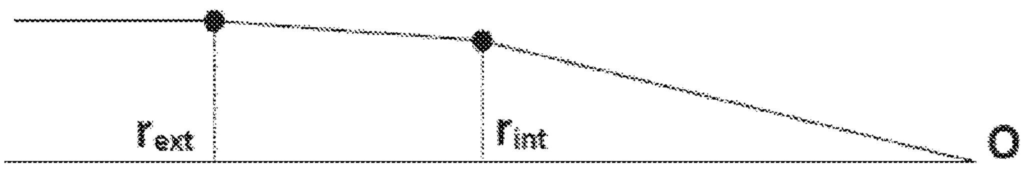

In detail, for the reference elements of lower height, a lower point is identified, at the intersection of the axis of its axis with the upper plane, and an upper point, on the extension of said axis at a height obtained on the straight line joining the points identified on the two highest reference elements placed on the sides, as shown in FIG. 18.

Figure 15:
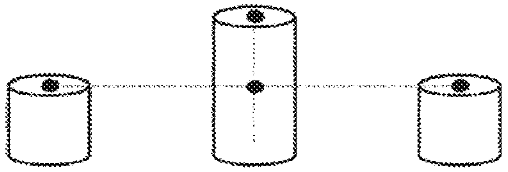

For the highest reference elements, the upper point is identified at the intersection of its axis with the upper plane, while the lower point is identified on said axis at a height obtained on the straight line joining the upper points of the two higher reference elements placed on the sides thereof, as shown in FIG. 15.

Figure 16:
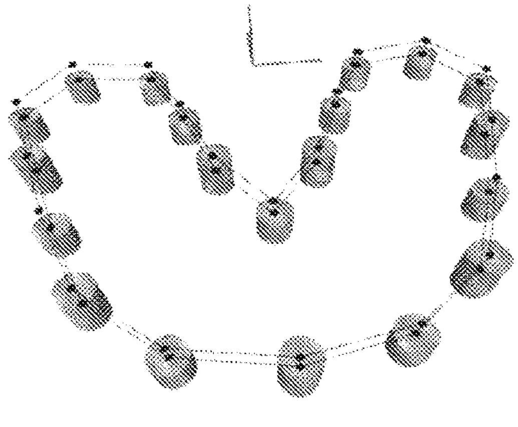
Figure 17:
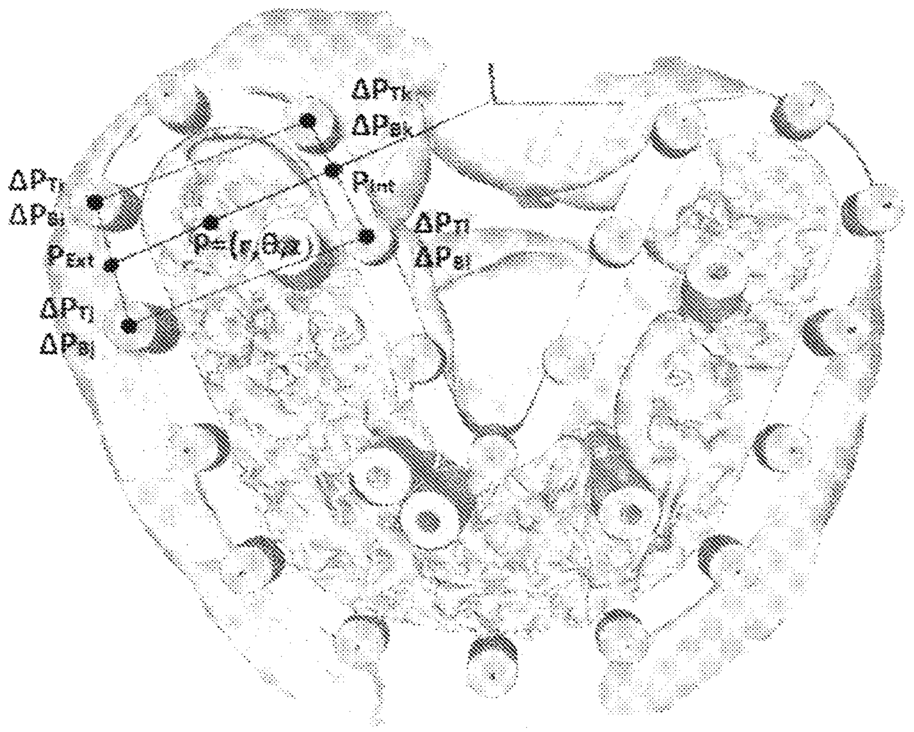

In this way, a double sequence of points is defined, a pair for each reference element, as shown in FIG. 16, and by comparing each of these points in the calibration set of data of the reference device and in the set of data acquired with intraoral scanning, one may calculate the difference:

$$\Delta P_n = (\Delta r_n, \Delta\theta_n, \Delta z_n)$$

Each point P of the intraoral scanning will be corrected by applying to it a ΔP which will be calculated starting from the $\Delta P_n$ of the points on the reference elements.

Identify the upper points with $P_{Tn}$ and the lower points of the reference elements with $P_{Bn}$.

Starting from the coordinate θ of the point, the pairs of points $(P_{Ti}, P_{Bi})$, $(P_{Tj}, P_{Bj})$ for the first portion (or outer portion) and the pairs of points $(P_{Tk}, P_{Bk})$, $(P_{Tl}, P_{Bl})$ for the second portion (or inner portion) are identified, such that $\theta_{Ti} \le \theta < \theta_{Tj}$, $\theta_{Bi} \le \theta < \theta_{Bj}$, $\theta_{Tk} \le \theta < \theta_{Tl}$ and $\theta_{Bk} \le \theta < \theta_{Bl}$.

Projecting the ray joining the point P to the origin on the outer plane generated by $(P_{Ti}, P_{Bi})$, $(P_{Tj}, P_{Bj})$ and on the inner one generated by $(P_{Tk}, P_{Bk})$, $(P_{Tl}, P_{Bl})$ we obtain 2 points Pext and Pint and we may calculate $\Delta P_{ext} = (\Delta r_{ext}, \Delta\theta_{ext}, \Delta z_{ext})$ and $\Delta P_{int} = (\Delta r_{int}, \Delta\theta_{int}, \Delta z_{int})$ as a linear combination of the $\Delta P_n$ of the generating points, dependent on the factors $(\theta - \theta_{Ti})/(\theta_{Tj} - \theta_{Ti})$, $(\theta - \theta_{Bi})/(\theta_{Bj} - \theta_{Bi}))$, $(z - z_{Ti})/(z_{Tj} - z_{Ti})$, $(z - z_{Bi})/(z_{Bj} - z_{Bi})$.

Figure 14:
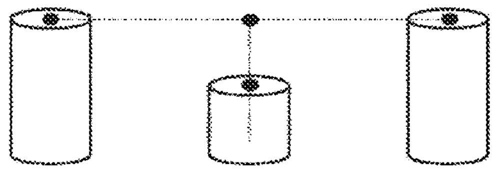

Considering a radial section, the point P may be outside the outer portion 11 of the support element 10 ($r_{ext}<r$), included in the space between the two inner 12 and outer 11 portions ($r_{ext}\leq r<r_{int}$) or inside the inner portion 12 ($r\leq r_{int}$), as shown in FIG. 14.

As illustrated by the graph of FIG. 18, if the point is outside the outer portion 12, the ΔP to be applied to said point P will be equal to $\Delta P_{ext}$.

If the point is comprised between the two inner and outer portions, the ΔP to be applied to point P will be a linear combination of ΔPext and ΔPint depending on the (r−rint)/(rext−rint) factors.

If the point P is inside the inner portion 12, the ΔP to be applied to the point P will be equal to ΔPint reduced by the factor (r/rint).

The error correction calculated according to the correction method of the present invention may be applied to intraoral scanning to reduce errors. In particular, by virtue of the method of the present invention it is possible to overcome the intrinsic limits of an intraoral scanner described above and to obtain accurate prosthetic models.

According to the present invention, the reference device may be used to perform extraoral scans on models using an intraoral scanner.

The operating principle of the apparatus and the relative method are the same as described above.

In this way, by using the reference device and the error correction method according to the present invention, it is possible to obtain digital models with a precision comparable or very similar to that provided by laboratory scanners.

The invention claimed is:

1. An apparatus for acquiring a dental impression by means of intraoral digital scanning, where said apparatus is configured to produce a set of data representing a three-dimensional image of at least one portion of the dental arch, said apparatus comprising:

a control unit;

an intraoral scanner connected to the control unit; and a reference device (1) to be fixed to the dental arch;

wherein said reference device (1) comprises:

a support element (10) which includes at least one curved portion (11, 12) adapted to be placed inside or outside the dental arch or on the arch itself;

three-dimensional reference elements (20) fixed to the support element (10) and projecting in the same direction from a support surface (16) of the support element (10) lying on a common plane;

and wherein said control unit is configured to receive the set of data acquired by the scanner representing a three-dimensional image of at least one portion of the dental arch and of the reference device applied thereto, and to process the acquired data set as a function of a set of predetermined geometric reference data for the reference device (1), said set of predetermined geometric reference data being obtained by scanning said reference device (1) with a scanner prior to performing the intraoral scan, and being provided as input data for the control unit.

2. Apparatus according to claim 1, wherein the support element (10) comprises a first outer portion (11) to be positioned outside the dental arch, i.e. in the vestibular area, and a second inner portion (12), to be positioned inside the dental arch, i.e. in the buccal cavity, said first (11) and second (12) portions having a substantially arched shape and being joined together forming a single element with a closed profile which can surround the entire dental arch.

3. Apparatus according to claim 1, wherein said reference elements (20) have an axial symmetrical shape with a reference axis and are arranged on the support element (10) in such a way that the respective reference axes are all parallel to one another.

4. Apparatus according to claim 3, wherein said reference elements comprise cylinders, cones, truncated cones, spheres or spherical caps.

5. Apparatus according to claim 1, wherein said reference elements (20) comprise an upper surface and have different heights, i.e. they have a different distance between said upper surface and the support surface (16) of the support element (10).

6. Apparatus according to claim 1, wherein said support element (10) comprises a curved bar with a cross-section having an area of between 5 $mm^2$ and 40 $mm^2$.

7. Apparatus according to claim 1, wherein the reference device (1) comprises a fixing element (30) adapted to enable fixing of the reference device to the scan abutments (P) of a dental implant, said fixing element comprising a plate (31) which can be movably coupled to the support element (10), said plate (31) being made of a rigid polymeric material.

8. Apparatus according to claim 1, wherein the reference device (1) comprises fixing means (40) adapted to enable fixing of the reference device to the scan abutments (P) of a dental implant, said fixing means (40) comprising at least one articulated arms (41) having a first end connected to the support element (10) and a second end, distal, which can be fixed to a pin (P) of the dental implant.

9. Apparatus according to claim 1, wherein on said reference elements, on the support element or on both there are graphic signs allowing better identification of their geometric parameters.

10. A method for acquiring a dental impression of a subject by means of intraoral digital scanning, said method comprising at least the following steps:

providing a reference device (1) comprising:

a support element (10) which includes at least one curved portion (11, 12) adapted to be placed inside or outside the dental arch or on the arch itself;

three-dimensional reference elements (20) fixed to the support element (10) and projecting in the same direction from a support surface (16) of the support element (10) lying on a common plane;

acquiring a set of predetermined geometric reference data for said reference device (1) by scanning said reference device (1) with a scanner, and providing said set of predetermined geometric reference data as input data to a control unit, prior to performing the intraoral scan;

fixing said reference device (1) to the patient's dental arch;

performing a scan of at least one portion of the dental arch by means of an intraoral scanner to produce a set of data representing a three-dimensional image of the at least one portion of the dental arch and of the reference device (1);

calculating, based on the set of data acquired with the intraoral scanner and on a set of geometric reference data for the reference device (1), a set of corrected data representative of the three-dimensional image of the at least one portion of the dental arch.

11. Method according to claim 10, wherein the set of data acquired with the intraoral scanner comprises a plurality of points (P) associated with coordinates (r, 0, z) with respect to the origin of a reference system (X, Y, Z) integral with the reference device (1) and wherein the position of each point (P) of the set of acquired data is corrected as a function of a parameter calculated based on the difference between the position of at least one identification point of each reference element in the set of geometric reference data and the position of said identification point in the set of acquired data.

* * * * *